United States Patent [19]

Small

[11] Patent Number: 4,523,256
[45] Date of Patent: Jun. 11, 1985

[54] VARIABLE POSITION LIGHT STAND

[76] Inventor: LeRoy O. Small, 3311 NE. 97th Ave., Vancouver, Wash. 98662

[21] Appl. No.: 549,718

[22] Filed: Nov. 8, 1983

[51] Int. Cl.³ .............................................. G03B 15/02
[52] U.S. Cl. ...................................... 362/11; 248/122;
248/124; 248/125; 362/3; 362/18; 362/250;
362/285; 362/287; 362/396; 362/418; 362/419;
362/427; 362/431
[58] Field of Search .................... 362/3, 11, 18, 250,
362/285, 287, 396, 418, 419, 427, 431; 248/122,
125, 124

[56] References Cited

U.S. PATENT DOCUMENTS

| | | | |
|---|---|---|---|
| 2,535,372 | 12/1950 | Schaeffer et al. | 362/250 X |
| 2,551,753 | 5/1951 | McCullough | 240/2 |
| 3,223,826 | 12/1965 | Macaluso, Jr. | 219/352 |
| 3,269,681 | 8/1966 | Azim | 248/123 |
| 4,228,489 | 10/1980 | Martin | 362/250 |
| 4,265,029 | 5/1981 | Jenkins | 248/124 |
| 4,363,084 | 12/1982 | Dimiceli | 362/250 |

Primary Examiner—Stephen J. Lechert, Jr.
Attorney, Agent, or Firm—Henderson & Sturm

[57] ABSTRACT

A portable, variable position light having a main vertical shaft and folding legs on the bottom thereof for holding such main shaft in a vertical position when in use. A pair of arms having elbows therein are attached to the main shaft such that it can be positioned vertically at any position along the length of the main shaft and whereby the angle of the arms can be adjusted to various desired angles with respect to the main shaft. The arm members have elbows therein for allowing the pivoting of a first inner part to a second outer part and whereby the elbow has a mechanism thereon for locking such second outer part with respect to the first inner part whereby the angle between the first and second parts can be maintained in whatever position desired. A standard light clamp has a locking mechanism attached to one end thereof for insuring that such lights do not slip off of the arm members.

5 Claims, 10 Drawing Figures

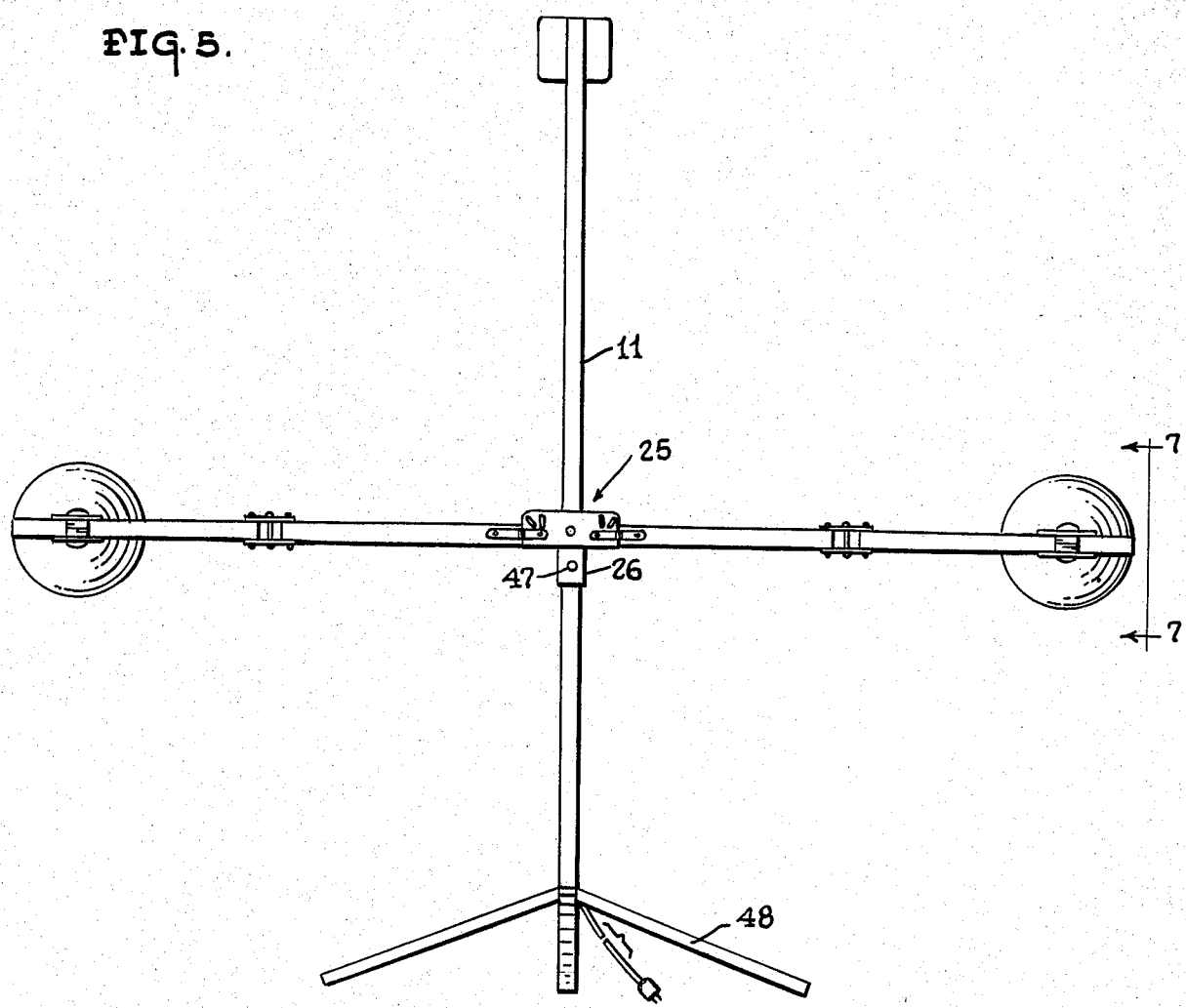
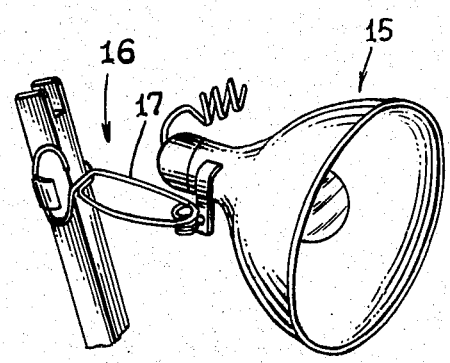
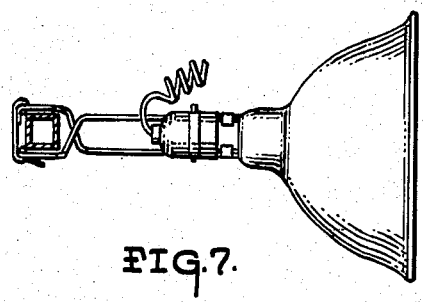

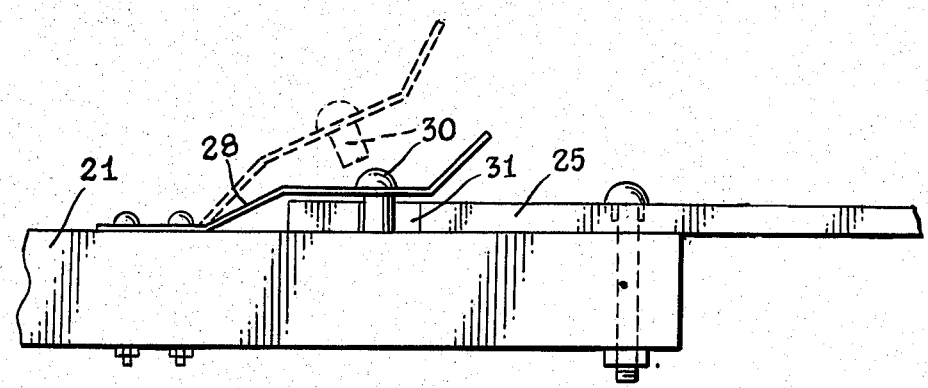
FIG. 8.
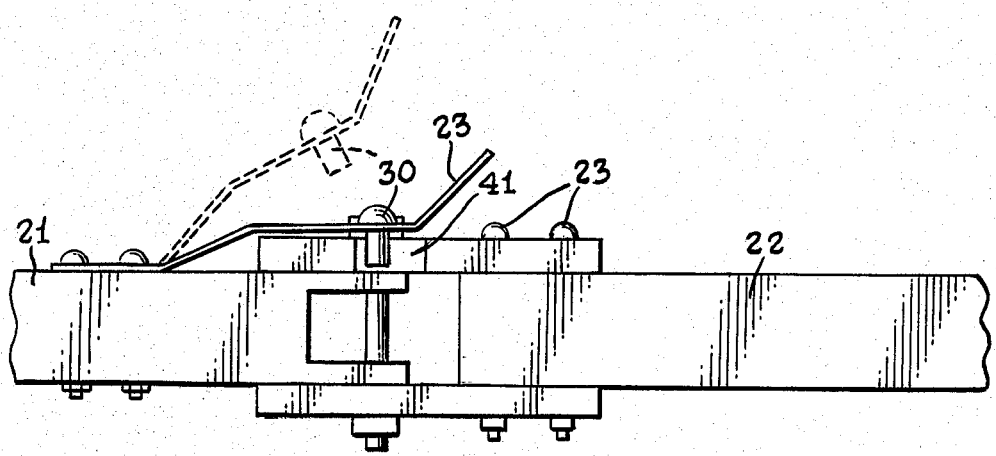
FIG. 9.
FIG. 10.
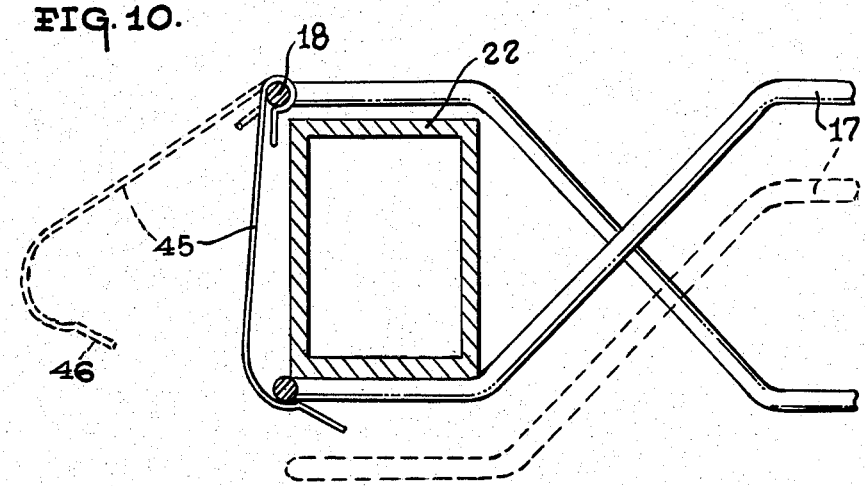

VARIABLE POSITION LIGHT STAND

TECHNICAL FIELD

This invention relates to articulated light support stands wherein the supported light fixture can be moved in several planes.

BACKGROUND ART

The present invention relates generally to stands for holding lights, and more particularly to such a light stand which is portable and has variable positions for such lights.

Various devices have been utilized for positioning lights to focus on some desired subject matter. For example, U.S. Pat. No. 2,551,753 to McCullough shows a photographic lighting bank having a plurality of lights movable mounted on a tripod structure for adjusting the horizontal position of lights for use in photography. Similarly, U.S. Pat. No. 3,223,826 to Macaluso shows a lamp stand for vertically and horizontally adjusting lights.

U.S. Pat. No. 3,269,681 to Azim shows a stand for adjusting the vertical position of a camera being held and such stand can also be utilized to pivot the camera about a 360° arc. Similarly, U.S. Pat. No. 4,265,029 to Jenkins shows a motor vehicle dryer stand adjusting heat lamps to dry paint after an automobile has been painted, and such stand shows vertical and horizontal positioning as well as structure for tipping the lights one way or the other.

While prior art is highly developed, there still exists a need for a portable light stand which can easily be folded up to be moved from place to place and which includes mechanisms for easily varying the angular position of the arms extending from a vertical base and furthermore having mechanisms for providing elbows in such light holding arms, whereby the light can easily, quickly and dependably be postioned in a desired position.

DISCLOSURE OF INVENTION

The present invention relates to a portable, variable position light having a main vertical shaft and folding legs on the bottom thereof for holding such main shaft in a vertical position when in use. A pair of arms having elbows therein are attached to the main shaft such that it can be positioned vertically at any position along the length of the main shaft and whereby the angle of the arms can be adjusted to various desired angles with respect to the main shaft. The arm members have elbows therein for allowing the pivoting of a first inner part to a second outer part and whereby the elbow has a mechanism thereon for locking such second outer part with respect to the first inner part whereby the angle between the first and second parts can be maintained in whatever position desired. A standard light clamp has a locking mechanism attached to one end thereof for insuring that such lights do not slip off of the arm members.

An object of the present invention is to provide an improved portable variable position light stand.

Another object of the invention is to provide a light stand which has not only vertical positioning capabilities whereby arm members may be pivotally adjusted so that the angle of the arm means can be varied with respect to a main vertical shaft.

Another object of the invention is to provide light holding arms of the type referred to above having elbows therein which are likewise angularly adjustable with respect to at least two parts of such arm members.

A further object of the invention is to provide an attachment to a convention light clamping structure for insuring that such light clamping structures do not slip off of the arm members.

Other objects, advantages and novel features of the present invention will become apparent from the following detailed description of the invention when considered in conjunction with the accompanying drawings.

BRIEF DESCRIPTION OF THE DRAWINGS

FIG. 5 is a rear view of the apparatus shown in FIG. 1;

FIG. 6 is an enlarged perspective view of the light structure and the apparatus for attaching it to the arm members;

FIG. 7 is a side elevational view of such structure taken along line 7—7 of FIG. 5;

FIG. 8 is an enlarged detailed view taken along line 8—8 of FIG. 4;

FIG. 9 is an enlarged view taken along line 9—9 of FIG. 3; and

FIG. 10 is an enlarged view of the clamping apparatus shown in FIG. 7 with a spring steel member designed for locking such clamp to the arm member shown in a locked position in solid lines and dashed lines in unlocked position.

DETAILED DESCRIPTION OF THE PREFERRED EMBODIMENT

Figure 1:
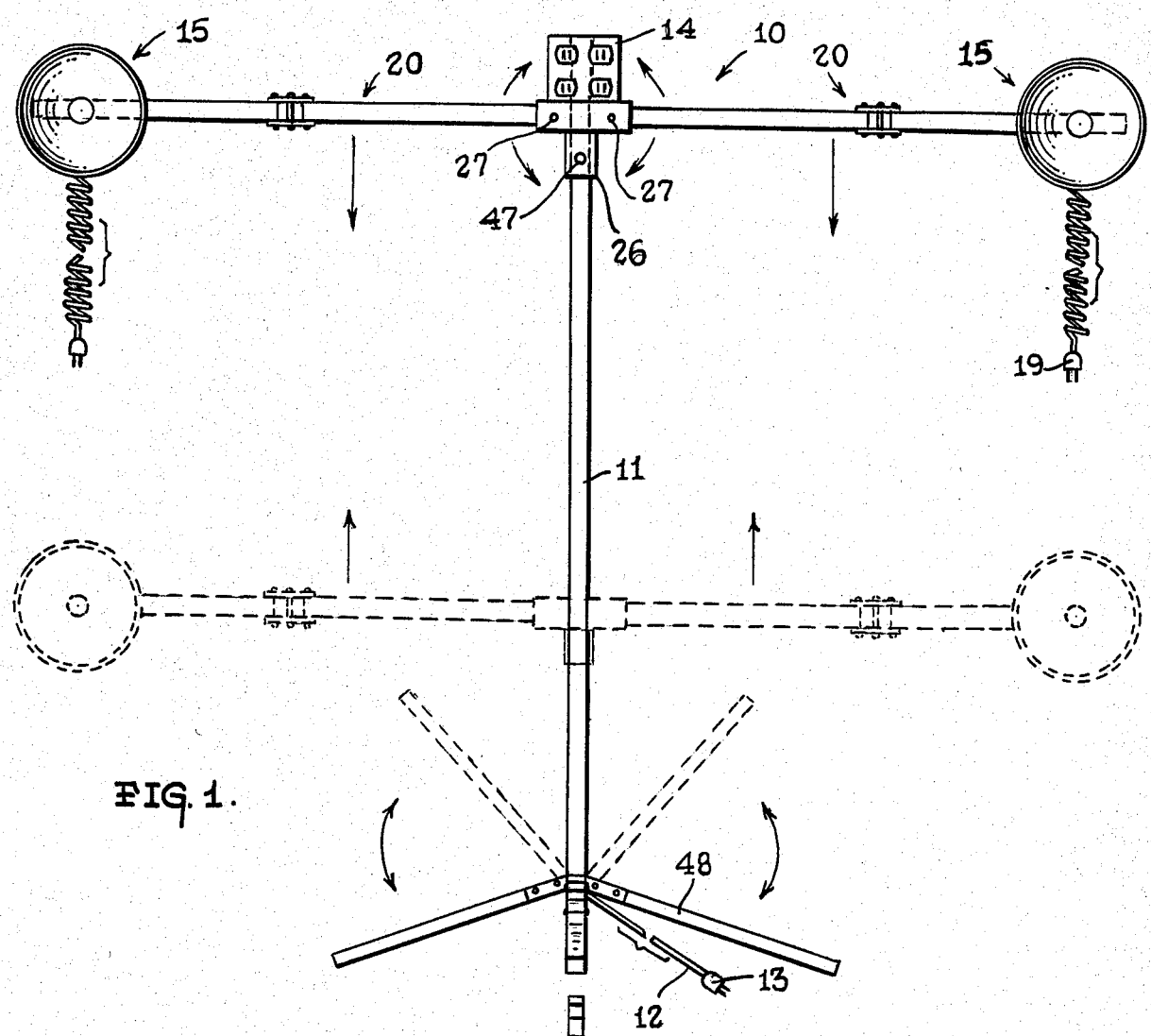
FIG. 1 shows a front elevational view of a preferred embodiment of the present invention and showing various positions of its parts in solid and dashed lines.

Referring now to the drawings wherein like reference numerals designate identical or corresponding parts throughout the several views, FIG. 1 shows an apparatus 10 constructed in accordance with the present invention. A vertical main shaft 11 made of a tubular material has an electrical cord 12 extending therethrough and such electrical cord 12 has a plug 13 on the lower end thereof and a receptacle 14 on the top thereof. This receptacle 14 is rigidly attached to the top of the main shaft 11 for providing a source of electricity for lamps 15 which are adjustably mounted to arm members 20.

Figure 4:
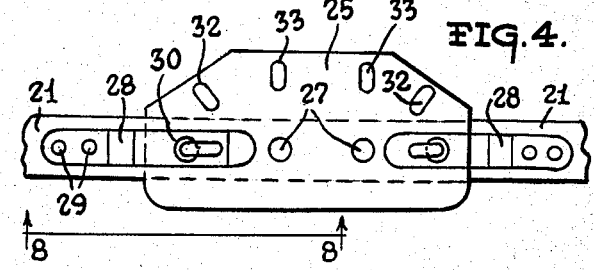
FIG. 4 is an enlarged detailed view of the mechanism for adjusting the angle of the arm members with respect to the vertical main shaft, taken along line 4—4 of FIG. 2.

Referring now to FIGS. 4 and 5, it is noted that an angled adjusting mechanism 25 is mounted by means of a member 26 for vertical adjustment up and down the main shaft 11. A set screw 47 is provided for holding members 25 and 26 at whatever vertical position is desired along the length of the shaft 11. The arm angle adjusting mechanism 25 has a pair of bolts 27 which extend through member 25 and through inner arm members 21 for allowing the members 21 to pivot with respect to the main shaft 11. A spring steel structure 28 is rigidly attached to members 21 by means of bolts 29 at one end thereof. A projection member 30 is rigidly attached to the spring steel member 28 at the other end thereof.

A plurality of openings 31, 32 and 33 are disposed within the member 25 so that when it is desired to pivot the arm member 21 with respect to the vertical main shaft 11, the free end of the spring steel member 28 can be manually lifted from the position shown in solid lines in FIG. 8 to the position shown in dashed lines, whereby members 21 can be so pivoted; and, once the arm 21 is in one of the three positions corresponding to openings 31, 32 or 33, then the member 28 can be released so that projection 30 extends into the desired one of the openings 31, 32 or 33. For example in FIG. 8 the first inner part 21 of the arm member 20 is disposed in the horizontal position and is locked in that position because member 30 is disposed into the opening 31 and is held in that position by the spring steel member 28. It will of course be appreciated that other types of springy, resilient materials other than steel are fully equivalent to spring steel disclosed herein.

Figure 2:
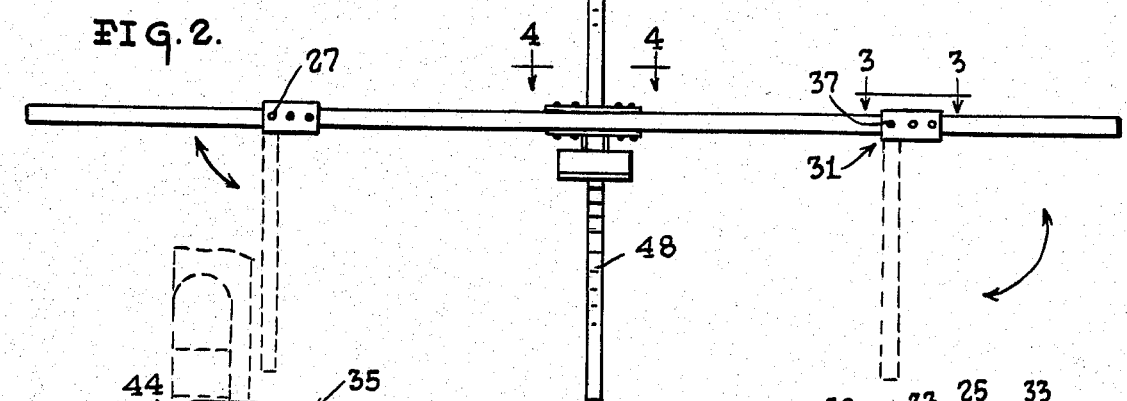
FIG. 2 is a top view of the structure of FIG. 1 and showing that the arm members can move between the position shown in dashed lines to the position shown in solid lines.
Figure 3:
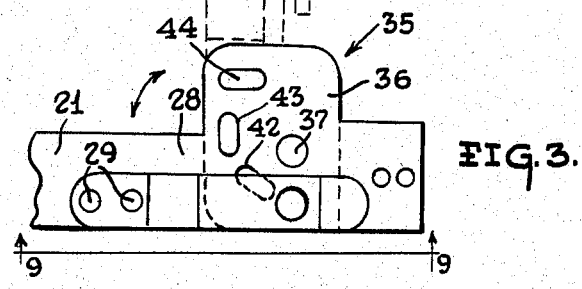
FIG. 3 is an enlarged cross-sectional view of the adjustable elbow structure taken along line 3—3 of FIG. 2.

Referring now to FIGS. 2 and 3, it is noted that the structure of elbow 35 is very similar to the adjusting mechanism of FIG. 4. For example, the spring steel member 25 is utilized again on the elbow structure and an elbow bracket 36 is disposed on each side of the first part 21 of the arm 20 and fasteners 29 attach the member 28 also to the member 21 as can be readily seen in FIGS. 3 and 9. The bracket 36 is rigidly attached to outer part 22 of the arm member 20 by means of fasteners 23. A bolt 37, extending through a pair of brackets 36 and through the member 21, as can be seen in FIGS. 3 and 9, permit the elbow 22 to pivot with respect to inner arm part 21.

A plurality of holes 41, 42, 43 and 44 are disposed in the brackets 36 whereby when the spring steel member 28 is manually moved from the position shown in solid lines in FIG. 9 to the position shown in dashed lines in FIG. 9, the arm part 22 can be pivoted with respect to the arm part 21 to one of four positions and then when the spring steel member 28 is released it will move back to the position shown in solid lines in FIG. 9 whereby the member 30 extends into one of the openings 41-44 and lock the members 21 with respect to part 22 in such relative positions.

Referring now to FIGS. 6, 7 and 10, it will be noted that the lamp 15 has a clamp 16 associated therewith which is attached at one end thereof to the lamp 15 and which has a spring steel wire member structure having handle portion 17 thereon which when squeezed at the portion 17 will open up the other end 18, for example from the position shown in solid lines in FIG. 10 to the position shown in dashed lines in FIG. 10. The spring steel locking member 45 snaps around the top wire 18, for example as shown in FIG. 10, to provide a pivotal mounting around such wire member 18. The lower end 46 of the spring steel member 45 can be pulled down manually from the position shown in dashed lines in FIG. 10 to the position shown in solid lines in FIG. 10, after the lamp is clamped onto the arm member 22 as shown in FIGS. 6, 7 and 10.

Accordingly, from the structure shown, it will be appreciated that the lamps 15 can easily be adjusted by clamping them on any part of the arm parts 21 or 22 of the arm members 20 and even along the vertical shaft 11, if so desired, by first squeezing the part 17 and then releasing such part 17 once it is around the arm member or vertical main member; and then putting the locking member 45 in the locked position as shown in FIG. 10. in order to prevent the lamp 15 from falling off of such arm members. It is also to be understood, of course, that the plug 19 will be plugged into the receptacle 14 and plug 13 into a source of electricity. In operation, the portable stand can be foled up by folding the legs 48 which are pivotally attached to the main shaft 11 upwardly from the operative position shown in solid lines in FIG. 1 to the dashed position and on up against the main shaft 11 for storage or transportation from place to place. Likewise, the arm members 20 can be pivoted downwardly about pivotal point 27 to a position along and parallel with the main shaft 11 when it is desired to transport such structure.

When utilized in the operative position, the various angular positions of the arm members 20 with respect to the main shaft 11 and the various pivotal positions of the second outer arm 22 with respect to the inner arm part 21 of the arm members 20 create an extremely adaptable light stand structure which is easily and quickly operable to position the light in whatever position is desired and, as explained above, is also easily operable to be folded up and transported from place to place.

Obviously, many modifications and variations of the present invention are possible in light of the above teachings. It is therefore to be understood that, within the scope of the appended claims, the invention may be practiced otherwise than as specifically described.

I claim:

1. A portable variable position light stand comprising:
a vertically disposed elongated main shaft;
means attached to the bottom of said main shaft for selectively holding said main shaft in said vertically disposed position;
arm means for attachment to said main shaft;
light means for producing light rays;
means for attaching said light means to said arm means;
arm attaching means for adjustably vertically attaching said arm means to said main shaft; and
angle adjusting means attached to said arm attaching means for selectively adjusting the angle of said arm means with respect to said main shaft, said angle adjusting means comprising housing and spring steel means attached at one end thereof said arm means and having projection means on the other end thereof and a plurality of openings in said housing means for receiving said projection means whereby the angle of said arm means will be different upon which of said openings said projection means is disposed in, said spring steel means being for biasing said projection means towards a respective one of said openings for locking the arm means in at a desired angle and permitting said projection means to be selectively removed from a respective one of said openings for permitting pivoting of the arm means for adjusting the position of the arm means to a different angle with respect to the main shaft.

2. The light stand of claim 1 wherein said light attachment means includes a spring clamp means for gripping said arm means on two sides thereof in a resilient manner, and spring steel means pivotally attached on one side end of said clamp means and adapted to be resiliently snapped over another end of said spring clamp means for locking said clamp means onto said arm means.

3. The light stand of claim 2 including elbow means for pivoting a first, inner part of said arm means with respect to a second, outer part; said elbow means including a second spring steel means attached at one end thereof to one of said parts and a bracket connected to said other part, said second spring steel member having a projection theron and being biased toward said bracket, and said bracket having a plurality of holes therein whereby the angle of said first part with respect to said second part being different depending upon which of said holes in which said projection is disposed within.

4. The apparatus of claim 3 wherein said main shaft is tubular and an electric cord extends therethrough, the lower end of said cord having a male electrical plug thereon for plugging it into a supply of electricity, and the other end of said electrical cord and the top of said main shaft has a female electrical receptacle unit attached thereto for providing a supply of electricity to said light means and whereby said light means is electrically connected to said electrical receptacle unit.

5. The apparatus of claim 4 wherein said light stand includes a plurality of arm means and a plurality of light means connected to said electrical receptacle unit.

* * * * *